United States Patent
Luo et al.

(10) Patent No.: US 7,330,336 B2
(45) Date of Patent: Feb. 12, 2008

(54) DUAL POLARITY BIAS FOR PROLONGING THE LIFE OF A HEATING ELEMENT IN MAGNETIC DATA STORAGE DEVICES

(75) Inventors: Jih-Shiuan Luo, San Jose, CA (US); Samuel Wei-san Yuan, Saratoga, CA (US)

(73) Assignee: Hitachi Global Storage Technologies Netherlands B. V., Amsterdam (NL)

( * ) Notice: Subject to any disclaimer, the term of this patent is extended or adjusted under 35 U.S.C. 154(b) by 0 days.

(21) Appl. No.: 11/439,296

(22) Filed: May 22, 2006

(65) Prior Publication Data

US 2007/0268624 A1 Nov. 22, 2007

(51) Int. Cl.
G11B 5/03 (2006.01)
G11B 5/127 (2006.01)

(52) U.S. Cl. .................. 360/126; 360/59; 360/66

(58) Field of Classification Search ......... 360/97.02, 360/128, 126, 294.7, 59, 66
See application file for complete search history.

(56) References Cited

U.S. PATENT DOCUMENTS

| | | | |
|---|---|---|---|
| 5,790,334 A | 8/1998 | Cunningham | 360/66 |
| 6,163,425 A | 12/2000 | Isokawa et al. | 360/66 |
| 6,163,426 A | 12/2000 | Nepela et al. | 360/66 |
| 6,452,735 B1 | 9/2002 | Egan et al. | 360/31 |
| 7,068,468 B2* | 6/2006 | Kamijima | 360/128 |
| 7,133,254 B2* | 11/2006 | Hamann et al. | 360/126 |
| 7,170,714 B2* | 1/2007 | Coffey et al. | 360/128 |
| 2002/0154439 A1 | 10/2002 | Sloan et al. | 360/75 |
| 2002/0191326 A1* | 12/2002 | Xu et al. | 360/75 |
| 2004/0075940 A1 | 4/2004 | Bajorek et al. | 360/110 |
| 2004/0114268 A1* | 6/2004 | Satoh et al. | 360/75 |
| 2004/0190175 A1* | 9/2004 | Chey et al. | 360/59 |
| 2004/0233755 A1 | 11/2004 | Bessho et al. | 365/221 |
| 2005/0105204 A1 | 5/2005 | Bloodworth et al. | 360/75 |

* cited by examiner

*Primary Examiner*—Jefferson Evans
(74) *Attorney, Agent, or Firm*—Zilka-Kotab; PC

(57) ABSTRACT

A magnetic read/write head having a heating element to induce a desired amount of thermal protrusion in the read and write elements to control the fly height of the read and write elements over a magnetic medium. The heating element is connected with circuitry that provides an electrical bias (voltage or current) that switches polarity in order to prevent electromigration, thereby greatly increasing the life of the heating element. The polarity of the heating element can be switched upon the occurrence of a predetermined event such as between read or write events or upon activating deactivating the disk drive device or could be performed at regular, predetermined time intervals. The dual polarity bias could also be provided by applying an AC bias to the heating element.

16 Claims, 7 Drawing Sheets

DUAL POLARITY BIAS FOR PROLONGING THE LIFE OF A HEATING ELEMENT IN MAGNETIC DATA STORAGE DEVICES

FIELD OF THE INVENTION

The present invention relates to magnetic data recording, and more particularly to a method and structure for increasing the durability and performance of a heater element in a magnetic read/write head.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally includes a coil layer embedded in one or more insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a space layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

In order to meet the ever increasing demand for improved data rate and data capacity, researchers are constantly striving the reduce the fly height of magnetic heads. Bringing the read and write elements of the head closer to the magnetic medium allows smaller bits of data to be written to and read from the magnetic disk. Traditionally fly heights have been controlled by the aerodynamics of the slider. The air bearing surface of the slider is configured with a surface topography that may include various pads and rails, strategically arranged to control the air pressure under the slider to minimize the height at which the slider flies while also ensuring that the slider does not contact the disk (i.e. crash).

However, as fly heights become extremely small, on the order of nanometers, the use of aerodynamics alone cannot sufficiently control fly height, conditions such as ambient pressure, and temperature affect the aerodynamics of the slider sufficiently that the desired extremely small fly height cannot be maintained. Therefore, there is a strong felt need for a design or method for constructing a sensor that can maintain a desired, extremely small fly height, even in varying ambient conditions. Such a design must, however, be very robust, having excellent reliability and long life.

SUMMARY OF THE INVENTION

The present invention provides a magnetic read/write head with a heating element for adjusting the fly height of the read and write elements. The heating element is connected with circuitry that provides a dual polarity electrical bias to the heating element.

The dual polarity bias advantageously reduces electromigration in the heating element, which greatly increases the life of the heating element. Using such a dual polarity bias also advantageously allows a higher power to by applied to the heating element without sacrificing heater life. In fact the lifespan of a heater has been found to increase roughly 10-100 times as compared with the lifespan of a heating using a single polarity electrical bias.

The dual polarity bias (voltage or current) applied to the heater can be provided by circuitry that switches the polarity of the bias upon occurrence of a predetermined event. The polarity could also be switched at regular time intervals. In addition, the dual polarity bias could be provided in the form of an AC bias so that polarity switching is constantly occurring.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
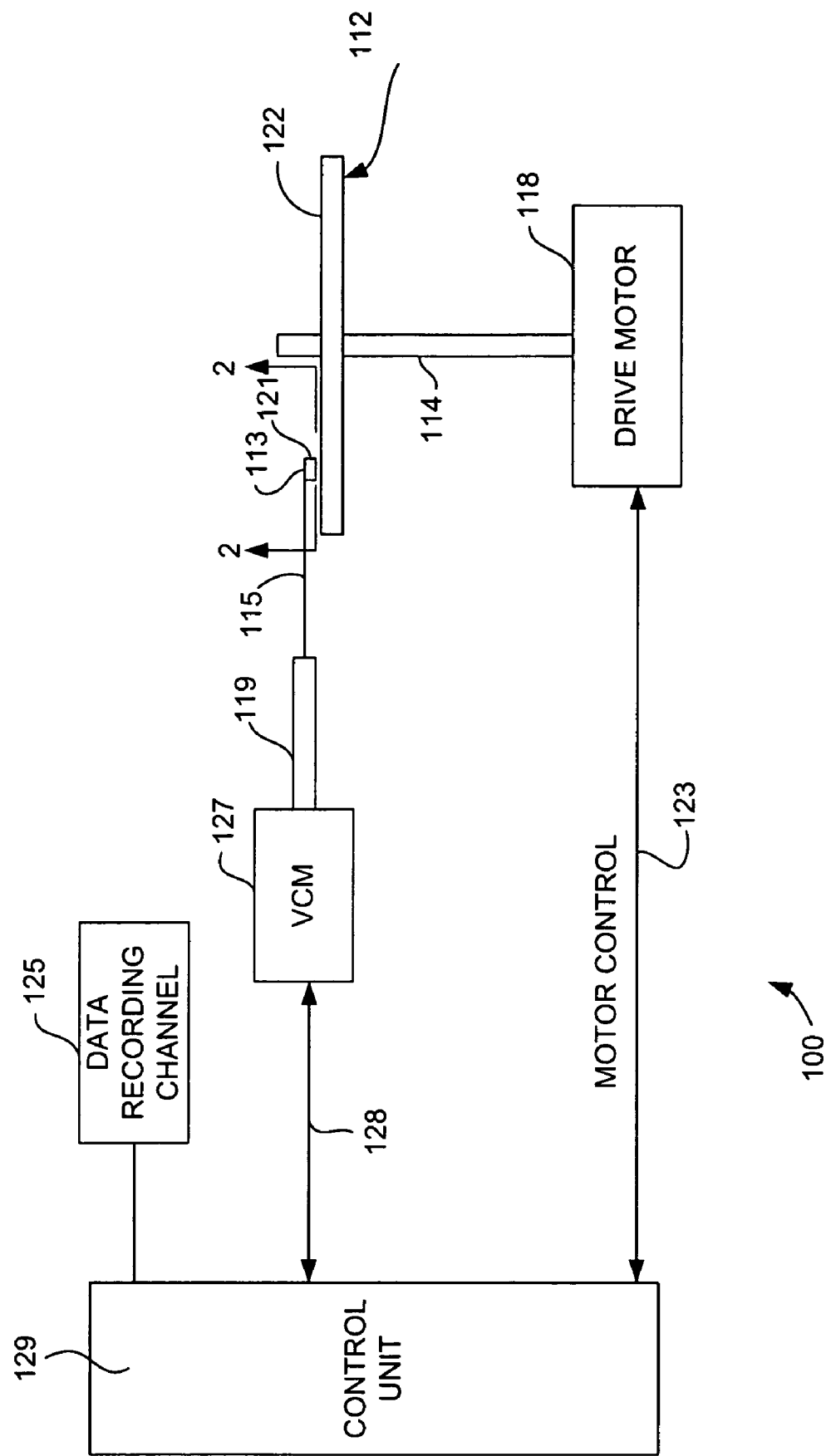
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one side 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
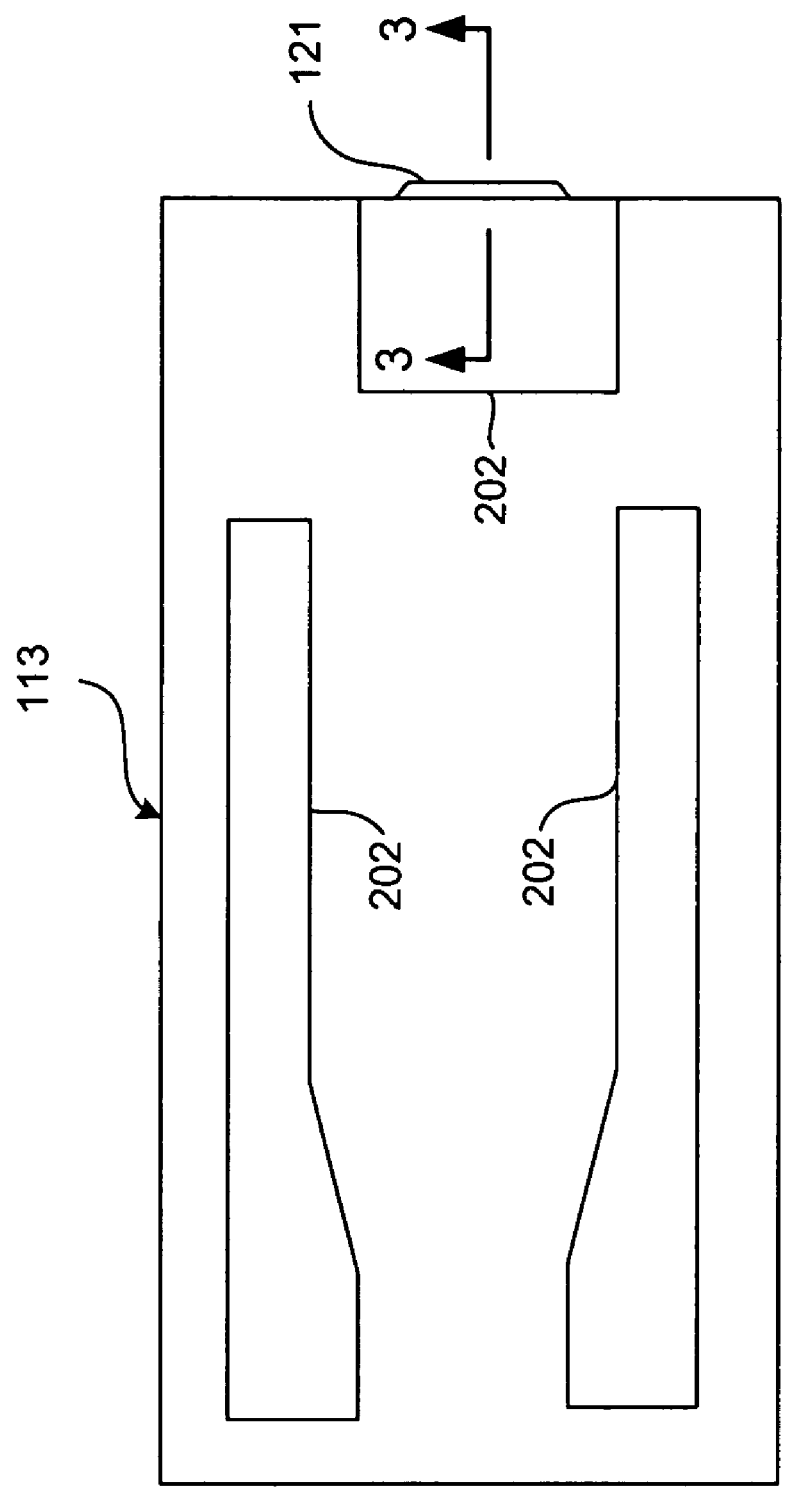
FIG. 2; is an ABS view of a slider, taken from line 2-2 of FIG. 3, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representative purposes only. It should be apparent that disk storage systems may contain a large number of disks and actuators, and each actuator may support a number of sliders.

Figure 3:
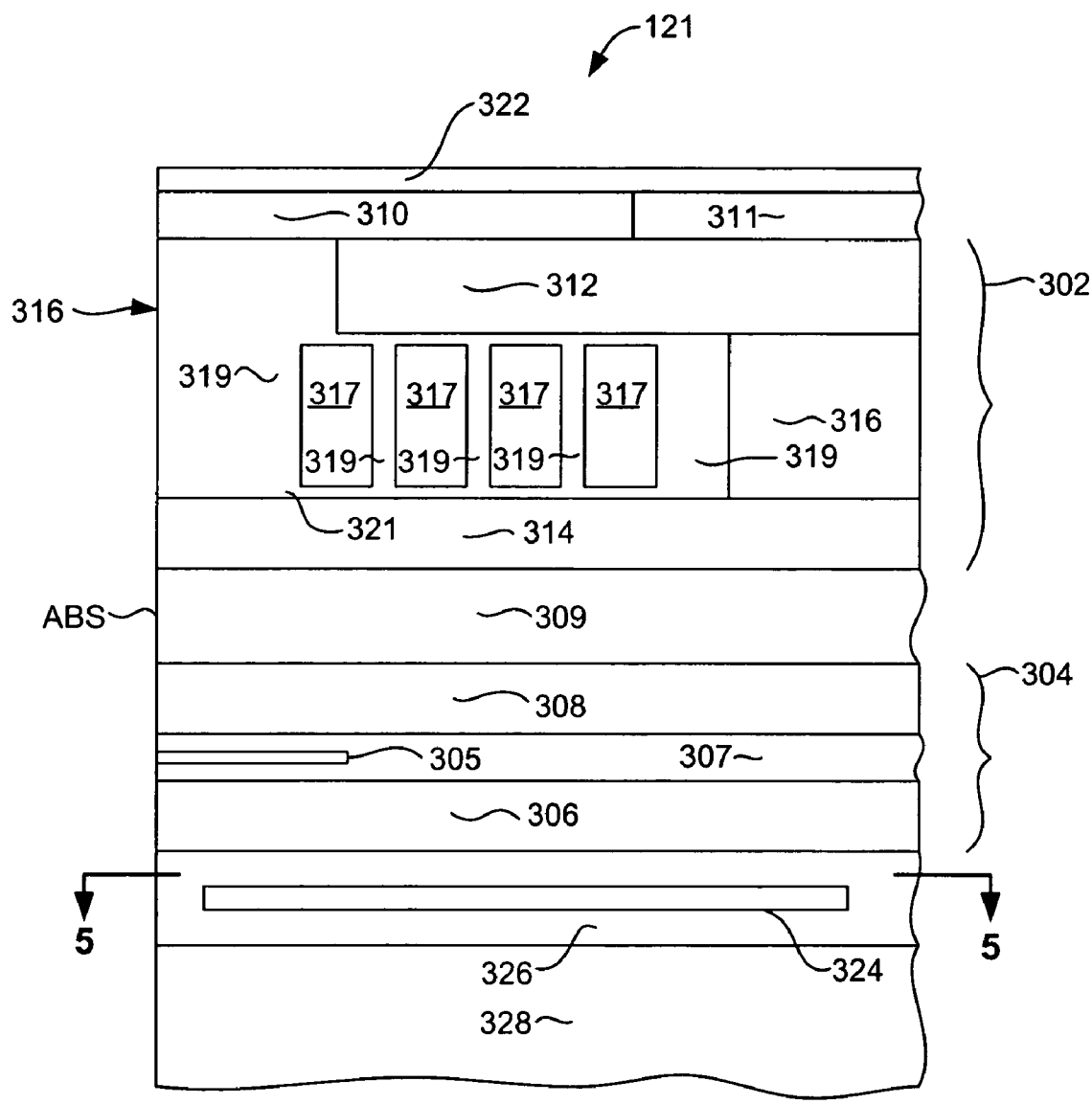
FIG. 3 is a cross sectional view of a magnetic head taken from line 3-3 of FIG. 2, enlarged, and rotated 90 degrees counterclockwise illustrating an embodiment of the invention incorporated into a perpendicular magnetic write head.

With reference now to FIG. 3, the magnetic head 121 for use in a perpendicular magnetic recording system is described. The head 121 includes a write element 302 and a read element 304. The read element 304 includes a magnetoresistive read sensor 305. The sensor 305, could be, for example, a current in plane giant magnetoresistive senor (CIP GMR), a current perpendicular to plane giant magnetoresistive sensor (CPP GMR) or a tunnel junction sensor (TMR). The sensor 305 is located between first and second magnetic shields 306, 308 and embedded in a dielectric material 307. The magnetic shields, which can be constructed of for example CoFe, NiFe or sendust, absorb magnetic fields, such as those from up-track or down-track data signals, ensuring that the read sensor 305 only detects the desired data track located between the shields 306, 308. A non-magnetic, electrically insulating gap layer 309 may be provided between the shield 308 and the write head 302. If the sensor 305 is a CIP GMR sensor, then the sensor will be insulated from the shields 306, 308 as shown in FIG. 3. However, if the sensor 305 is a CPP GMR sensor or TMR sensor, then, the top and bottom of the sensor 305 can contact the shields 306, 308 so that the shields can acts as electrically conductive leads for supplying a sense current to the sensor 305.

With continued reference to FIG. 3, the write element 302 includes a write pole 310 that is magnetically connected with a magnetic shaping layer 312, and is embedded within an insulation material 311. The write pole 310 has a small cross section at the air bearing surface and is constructed of a magnetic material. The write head 302 also includes a return pole 314 that is constructed of a magnetic material such as CoFe or NiFe and has a cross section parallel to the ABS surface that is significantly larger than that of write pole 310. The return pole 314 is magnetically connected with the shaping layer 312 and write pole 310 by a back gap portion 316 as shown in FIG. 3. The return pole 314 and back gap 316 can be constructed of, for example, NiFe, CoFe or some other magnetic material.

An electrically conductive write coil 317, shown in cross section in FIG. 3, passes through the write element 302 between the shaping layer 312, and the return pole 314. The write coil 317 is surrounded by a non-magnetic, electrically insulating material such as hard baked photoresist or alumina (coil insulation layer 319). The insulation layer 319 may consist of a single insulating material or may be several layers of the same or different materials. A hard, electrically insulating, protective layer 322, constructed of, for example alumina may be provided over the top of the head 121 to protect the head from damage from corrosion, abrasion, etc.

When a current passes through the coil 317, the resulting magnetic field causes a magnetic flux to flow through the return pole 314, back gap 316, shaping layer 312 and write pole 310. This magnetic flux causes a write field to be emitted toward an adjacent magnetic medium (not shown). This magnetic field emitted from the write pole 310 magnetizes a relatively higher coercivity, thin, top magnetic layer on the magnetic medium. This magnetic field travels through a magnetically soft underlayer of the magnetic medium to the return pole 314, where it is sufficiently spread out that it does not erase the signal written by the write pole 310.

In order to maximize the performance of the magnetic head 121, it is important that both the read element 304 and write element 302 be as close to the magnetic medium as possible during use. This distance from the head 121 to the surface of the magnetic medium (not shown) has been referred to as the fly height of the head 121. This fly height has traditionally been controlled aerodynamically by configuring the surface of the slider 113 (FIG. 2) with a desired air bearing surface shape (ABS). For example, the surface of the slider can be formed with raised portions, or pads 202, which cause desired higher or lower pressure areas under the slider 113 during use.

As fly heights become ever smaller (on the order of nanometers) the use of slider aerodynamics alone cannot sufficiently control fly height. For example, environmental conditions such as ambient air pressure and temperature affect the fly height sufficiently that the head can either crash into the disk or will be too far from the disk for maximum performance. According to an embodiment of the present invention, thermal expansion of the head can be used to adjust fly height. Therefore, according to an embodiment of the present invention, a heat element 324 is provided to selectively heat the head 121 a desired amount. Based on the thermal expansion coefficient of the materials making up the head 121, this heating causes desired portions of the read element 304, and write element 302 to protrude a desired amount from the air bearing surface (ABS) (ie. to the left in FIG. 3). The heating element 324 can be located at various locations within the head 121, and is shown in FIG. 3 as being located beneath both the read element 304 and write element 302. For example, the heating element 324 can be embedded in an insulating layer 326 on a substrate 328.

Figure 4:
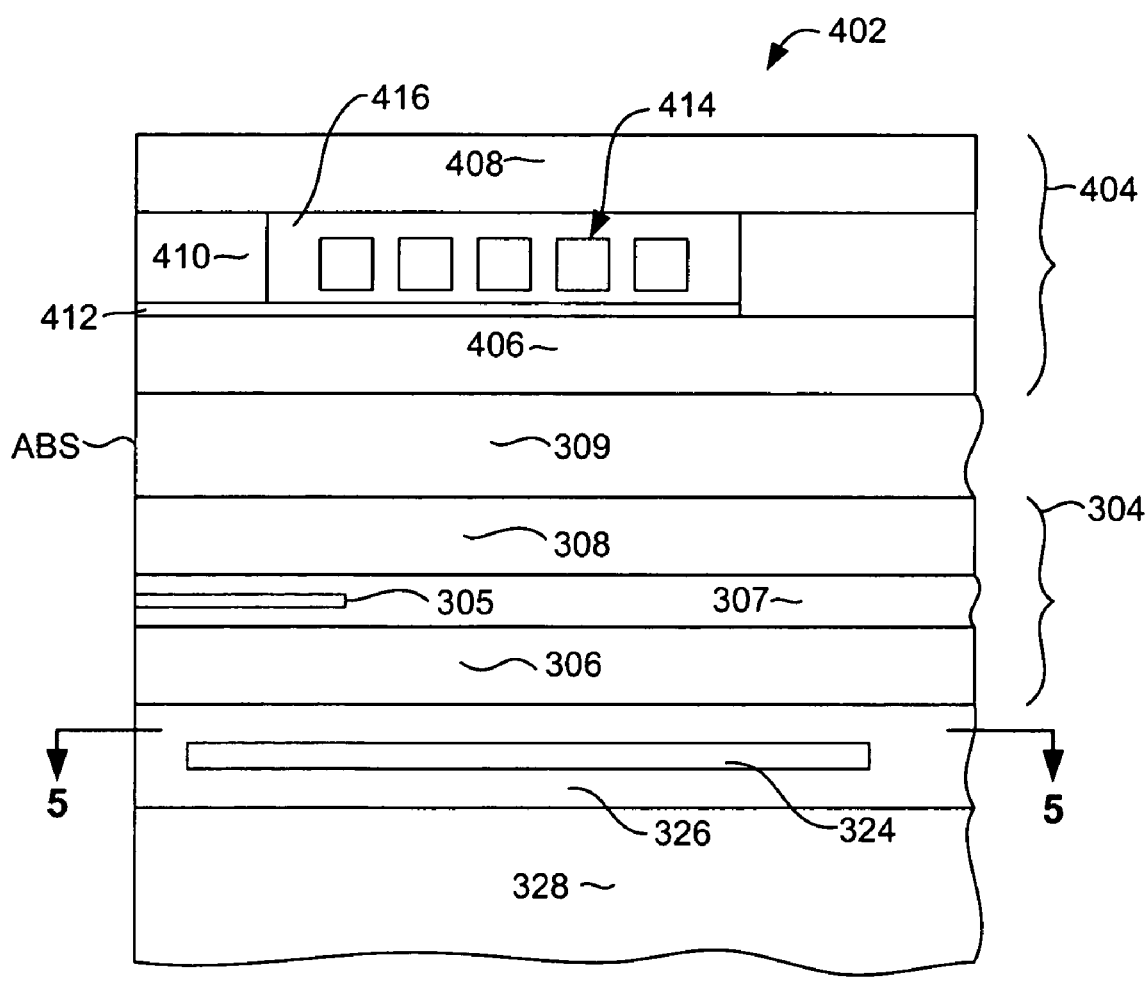
FIG. 4 is a cross sectional view similar to that of FIG. 3 illustrating an embodiment of the present invention incorporated in a longitudinal magnetic head.

With reference to FIG. 4, the invention can also be embodied in a more traditional longitudinal recording head, 402. The longitudinal recording head has a read element 304 that can be similar to that described above with reference to FIG. 3, and has a longitudinal write element 404.

The write element 404 has a first or bottom magnetic pole 406, and a top pole 408. The write element may also have a magnetic pedestal 410 that may be magnetically connected with the top pole 408. The top pole and bottom pole 406, 408 are magnetically connected with one another by a magnetic back gap layer 412 in a region removed from the air bearing surface (ABS). The top pole 408 and pedestal 410 are separated from one another at that ABS by a non-magnetic write gap layer 412.

An electrically conductive write coil 414 passes between the top and bottom poles, between the back gap layer 412 and pedestal 410. The coil 414 is embedded in a non-magnetic, electrically conductive coil insulation layer 416. When a current passes through the coil 414, a resulting magnetic field causes a magnetic flux to flow through the magnetic pole 406, pedestal 410 and back gap layer 412. This magnetic flux results in a magnetic fringing field (write field) that fringes out from the ABS across the write gap layer 412.

As with the previously described embodiment, the magnetic head 402 includes a heater element 324 that may be embedded in an insulation layer 326 formed on a substrate 328. Also as with the previously described embodiment, the heat element 324 selectively heats the read and write elements 304, 404, causing them to protrude a desired amount to maintain a desired fly height adjustment.

A challenge that arises with the use of a heating element such as that described above 324 is that electromigration degrades the heating element. Like any thin film device with a bias current (Voltage) and Joule heating, thermally induced degradation such as interlayer diffusion, current density and temperature life time degradation such as electromigration need to be taken into account to achieve the optimized life time performance, which is preferably be on the order of 5 years typically.

The present invention mitigates the effect of electromigration, allowing the heater to run at a higher bias current (or voltage) or to have a longer heater life. This is achieved by periodically switching from one bias polarity to the other bias polarity at regular, predetermined time intervals or at the occurrence of a predetermined event. The polarity switching can be triggered by the occurrence of an event such as, for example, turning the disk drive device off and on, or can be performed between reading or writing events, such as when the slider moves from one sector to another of the disk. The polarity switching could also be accomplished by applying an alternating current (AC) rather than a direct current (DC) to the heater 324. Switching the polarity causes the electron wind to blow in both directions so that electromigration is significantly reduced.

Figure 5:
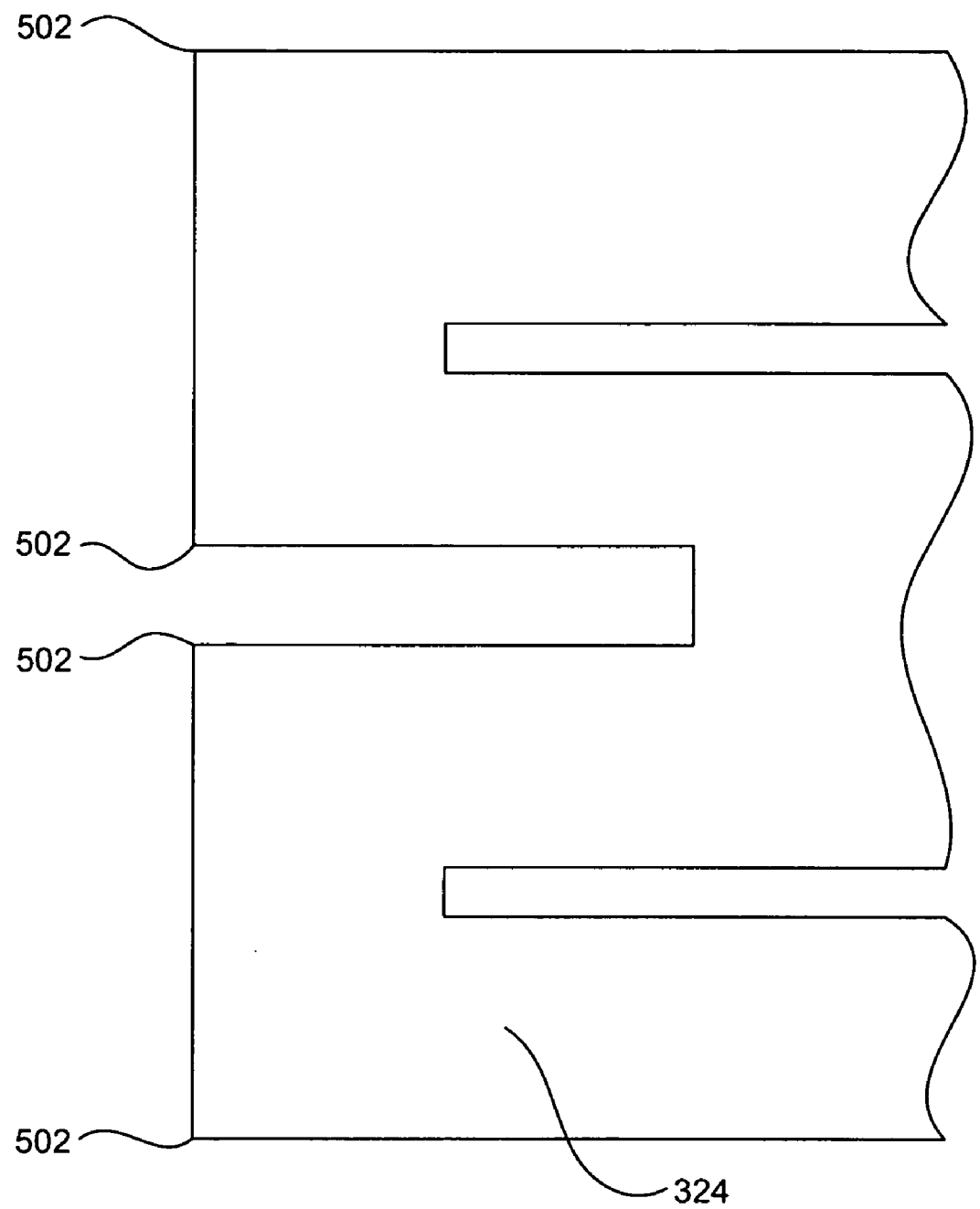
FIG. 5 is a top down view taken from line 5-5 of FIG. 3 illustrating a heating element according to an embodiment of the invention.

FIG. 5 shows a top down view of the heater element 324 as seen from line 5-5 of FIG. 4. As can be seen, the heater may have a serpentine shape so as to maximize heating efficiency, and achieve desired electrical resistance. The electromigration caused that would result if the heat current were constantly flowing in the same direction, would be especially problematic of the corners 502 of the serpentine shape.

Figure 6:
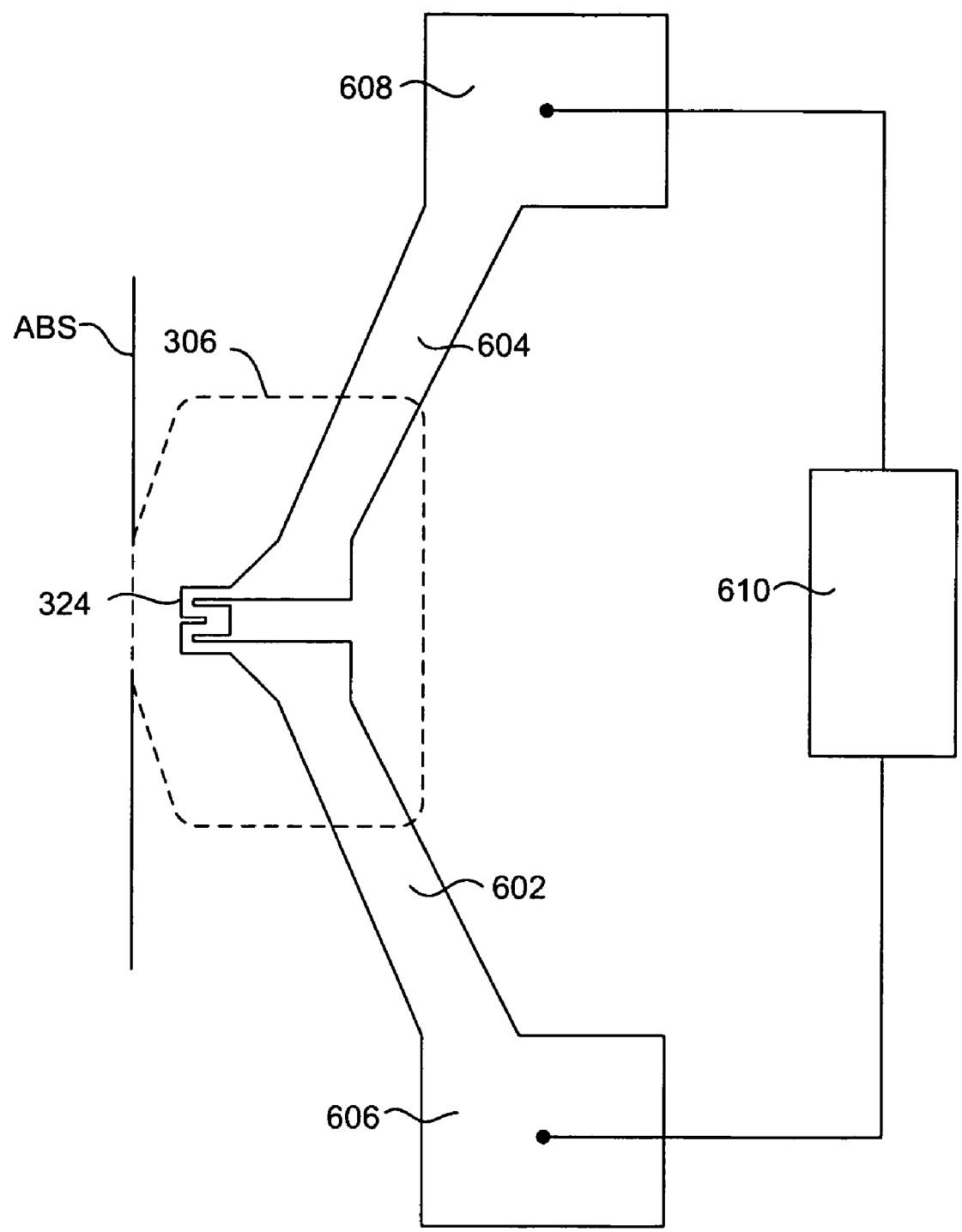
FIG. 6 is an expanded top down view of the heating element of FIG. 5 connected with circuitry for providing a polarity switching electrical bias to the heating element.

FIG. 6 shows an expanded view of the heating element 324. The relative location of the magnetic shield 306 above the heating element 324 is shown in dashed line, and is actually out of the plane of the page as shown in FIG. 6 (ie. above the heating element 324). As can be seen, the heating element is connected with first and second electrically conductive leads 602, 604, that may terminate in first and second connection pads 606, 608.

The leads 602, 604 and pads 606, 608 are electrically connected with control circuitry 610, illustrated schematically in FIG. 6. The circuitry 610 may include a power source, and includes software and or hardware for switching the bias polarity to switch the direction of the bias current (or voltage) applied to the heater. As discussed above, the circuitry 610 can be programmed to switch the bias polarity upon occurrence of a given event, such as between read and/or write events or when the device is turned on or off, or could be programmed to occur at given time intervals (e.g. every 30 seconds). The polarity switching could also be provided by the circuitry by applying an AC current rather than a DC current.

Figure 7:
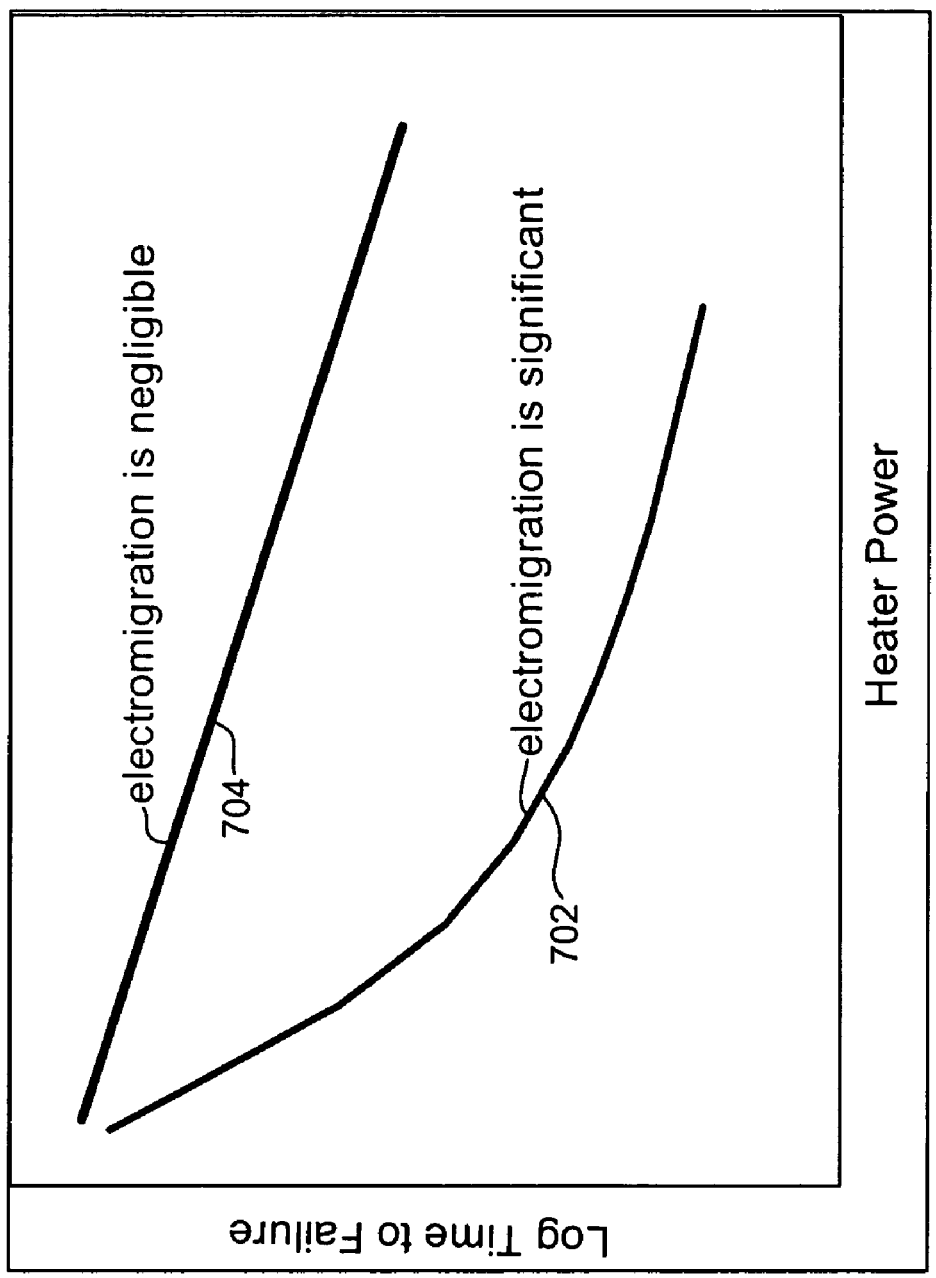
FIG. 7 is a graph illustrating the relationship between heater life and heater power for heaters with and without electromigration.

Measurements have verified that a significant increase in heater life can be achieved by the use of bias voltage (or current) polarity switching as described above. In fact, polarity switching was found to improve heater life by 10 to 100 times compared with a single polarity design. The polarity switching described above, virtually eliminates electromigration. As can be seen in FIG. 7, reducing electromigration significantly improves heater life. FIG. 7, illustrates how the time to failure relates to heater power applied. The curved line 702 indicates the time to failure when electromigration is allowed to occur. The straight line 704 indicates the time to failure there is no electromigration, such as when a reverse polarity design is used. As can be seen, the lifespan of a heater is significantly increased when there is no electromigration. What's more this improvement increases with increasing power, which means heater power and effectiveness can be increased by use of a polarity switching scheme according to the present invention.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic head for recording and reading data, the head comprising:
   a magnetic read element;
   a magnetic write element;
   a heating element in thermal contact with the read and write elements; and
   circuitry, electrically connected with heating element for providing a dual polarity electrical bias to the heating element and wherein the magnetic head is embodied in a disk drive system, and wherein the circuitry is configured to switch a polarity of the electrical bias when the disk drive is deactivated.

2. A magnetic head as in claim 1 wherein the circuitry for providing an electrical bias to the heating element includes a voltage source.

3. A magnetic head as in claim 1 wherein the circuitry for providing an electrical bias to the heating element includes a current source.

4. A magnetic head as in claim 1 wherein the circuitry is configured to switch a polarity of the electrical bias upon occurrence of a predetermined event.

5. A magnetic head as in claim 1 wherein the circuitry is configured to switch a polarity of the electrical bias at predetermined time intervals.

6. A magnetic head as in claim 1 wherein the circuitry is configured to switch a polarity of the electrical bias between read events.

7. A magnetic head as in claim 1 wherein the circuitry is configured to switch a polarity of the electrical bias between write events.

8. A magnetic head as in claim 1 wherein the circuitry is configured to provide an AC electrical bias.

9. A magnetic head as in claim 1 wherein magnetic head is embodied in a disk drive system, and wherein the circuitry is configured to switch a polarity of the electrical bias when the disk drive is activated.

10. A magnetic head as in claim 1 wherein the circuitry includes circuitry for providing an AC bias to the heating element.

11. A magnetic head as in claim 1 wherein the circuitry includes circuitry for receiving DC power and converting the DC power into AC power and delivering the AC power to the heating element.

12. A method for extending the life of a heating element in a magnetic head embodied in a disk drive system, comprising:
    applying an electrical bias to the heating element; and
    reversing the bias when the disk drive system is deactivated.

13. A magnetic head, comprising:
    a substrate;
    a heating element formed over the substrate;
    a read element separated from the heating element by an electrically insulating layer,
    a write element formed adjacent to the read element; and
    electrical circuitry connected with the heating element and functional to provide a dual polarity electrical bias to the heating element, the amount of electrical bias being controlled to provide a desired amount of thermal protrusion in the read and write heads; wherein
    magnetic head is embodied in a disk drive system, and wherein the circuitry is configured to switch a polarity of the electrical bias when the disk drive is deactivated.

14. A magnetic head as in claim 13 wherein the circuitry is functional to provide an electrical bias that switches polarity upon occurrence of a predetermined event.

15. A magnetic head as in claim 13 wherein the circuitry is functional to provide an electrical bias that switches polarity at predetermined time intervals.

16. A magnetic head as in claim 13 wherein the circuitry is functional to provide an AC electrical bias to the heating element.

* * * * *